(12) United States Patent
Olson et al.

(10) Patent No.: US 6,861,154 B2
(45) Date of Patent: Mar. 1, 2005

(54) COATING WEAR INDICATOR

(75) Inventors: Keith Olson, Apple Valley, MN (US); Paul Mattia, Prior Lake, MN (US)

(73) Assignee: Ecolab, Inc., St. Paul, MN (US)

( * ) Notice: Subject to any disclaimer, the term of this patent is extended or adjusted under 35 U.S.C. 154(b) by 111 days.

(21) Appl. No.: 10/255,993

(22) Filed: Sep. 26, 2002

(65) Prior Publication Data

US 2004/0071950 A1 Apr. 15, 2004

(51) Int. Cl.$^7$ .............................. C09D 5/32; C09D 5/00
(52) U.S. Cl. ....................... 428/546; 428/212; 428/457; 106/31.15; 427/409
(58) Field of Search ................................ 428/212, 457, 428/546, 413, 423, 500; 427/409; 106/31.15, 31.04

(56) References Cited

U.S. PATENT DOCUMENTS

| | | | |
|---|---|---|---|
| 4,327,155 A | * 4/1982 | Hanneman .................. | 428/556 |
| 4,517,330 A | 5/1985 | Zdanowski et al. | |
| 4,918,976 A | * 4/1990 | Fogal, Sr. ..................... | 73/40.7 |
| 5,023,019 A | * 6/1991 | Bumpus ...................... | 252/607 |
| 5,156,591 A | * 10/1992 | Gross et al. .................. | 604/20 |
| 5,228,478 A | * 7/1993 | Kleisle ........................ | 138/104 |
| 5,319,018 A | 6/1994 | Owens et al. | |
| 5,453,451 A | 9/1995 | Sokol | |
| 5,529,541 A | * 6/1996 | Perrier ........................ | 473/54 |
| 5,773,487 A | 6/1998 | Sokol | |
| 5,830,937 A | 11/1998 | Shalov et al. | |
| 6,258,765 B1 | 7/2001 | Wei et al. | |
| 6,391,226 B1 | * 5/2002 | Chauvette et al. .......... | 252/399 |
| 2003/0081203 A1 | * 5/2003 | Chen et al. ................. | 356/300 |

FOREIGN PATENT DOCUMENTS

| | | |
|---|---|---|
| EP | 0 672 732 | 2/1995 |
| GB | 2 123 009 | 1/1984 |
| WO | WO 98/11168 | 6/1996 |
| WO | WO 98/20082 | 11/1999 |
| WO | WO 01/83878 | 11/2001 |

* cited by examiner

Primary Examiner—D. Lawrence Tarazano
(74) Attorney, Agent, or Firm—Crompton Seager Tufte LLC

(57) ABSTRACT

A coating composition includes a material adapted to form a coating; and a material that fluoresces when exposed to U.V. light or the material adapted to form a coating contains a U.V. blocker disposed on a U.V. indicator. A kit containing a U.V. indicator and material adapted to form a coating containing a U.V. blocker. Methods of coating a substrate with the coating compositions are also disclosed.

4 Claims, 5 Drawing Sheets

COATING WEAR INDICATOR

BACKGROUND OF THE INVENTION

The invention relates to compositions, coated substrates and method that indicate a coating is worn and no longer protecting the substrate.

Coating disposed on substrates may contain components that protect the substrate from damage, for example, from U.V. light. These coatings can wear over time and lose the ability to protect the substrate from damage from, for example, U.V. light. Also, these coatings may be clear and thus make it difficult to visually determine if the coating is still protecting the substrate.

Given the foregoing, there is a need to provide coating compositions that can indicate when a coating is worn and no longer protecting the substrate.

DETAILED DESCRIPTION

Definitions

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Figure 1:
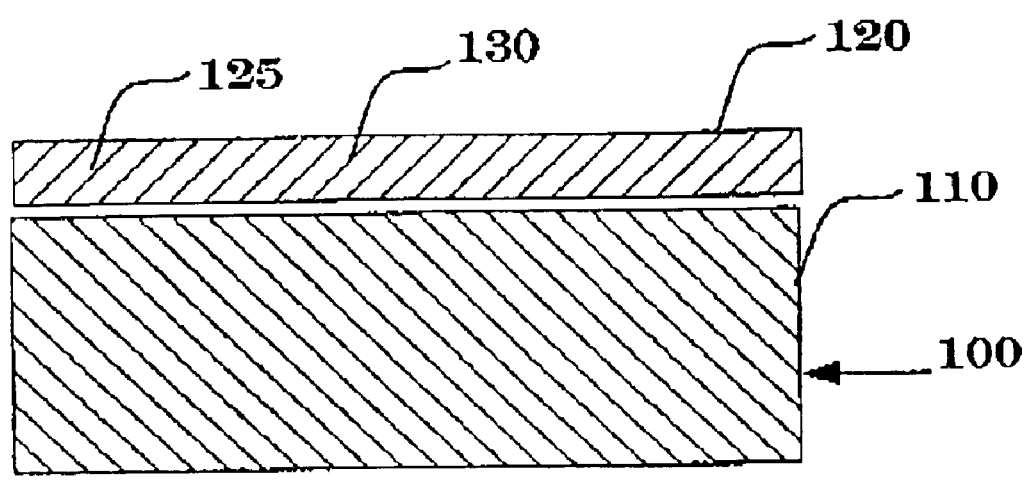
FIG. 1 is a cross-sectional view of a coated substrate in accordance with an embodiment of the invention.

FIG. 1 is a cross-sectional view of a coated substrate 100 in accordance with an embodiment of the invention. A coating 120 is disposed on a portion of a substrate 110. The coating 120 may be a single layer or a plurality of layers. The coating 120 is formed from a material adapted to form a coating. The coating 120 can include a material that fluoresces when exposed to U.V. light 125 and/or a U.V. blocker 130.

Figure 2:
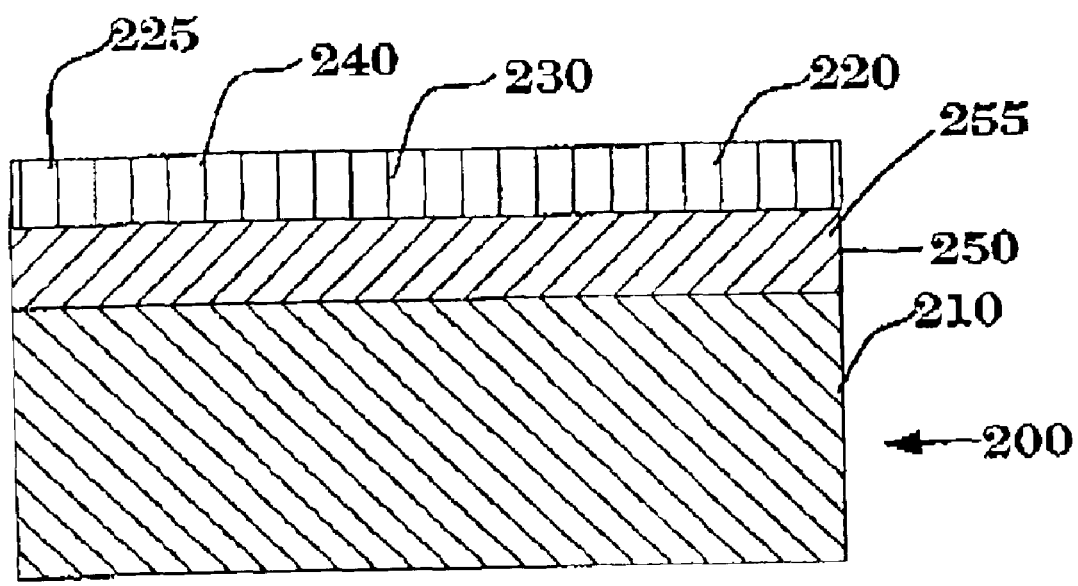
FIG. 2 is a cross-sectional view of a coated substrate in accordance with another embodiment of the invention.

FIG. 2 is a cross-sectional view of a coated substrate 200 in accordance with another embodiment of the invention. A coating 220 is disposed on a portion of a substrate 210. The coating 220 may be a single layer or a plurality of layers 240, 250. The coating 220 is formed from a material adapted to form a coating. The coating 220 can include a material that fluoresces when exposed to U.V. light 225 and/or a U.V. blocker 230. The coating can include an intermediate layer 250 disposed between a portion of the substrate 210 and a portion of a top layer 240. The top layer 240 can include or be free of a material that fluoresces when exposed to U.V. light 225 and/or a U.V. blocker 230. The intermediate layer 250 may include a pH indicator 255.

Figure 3:
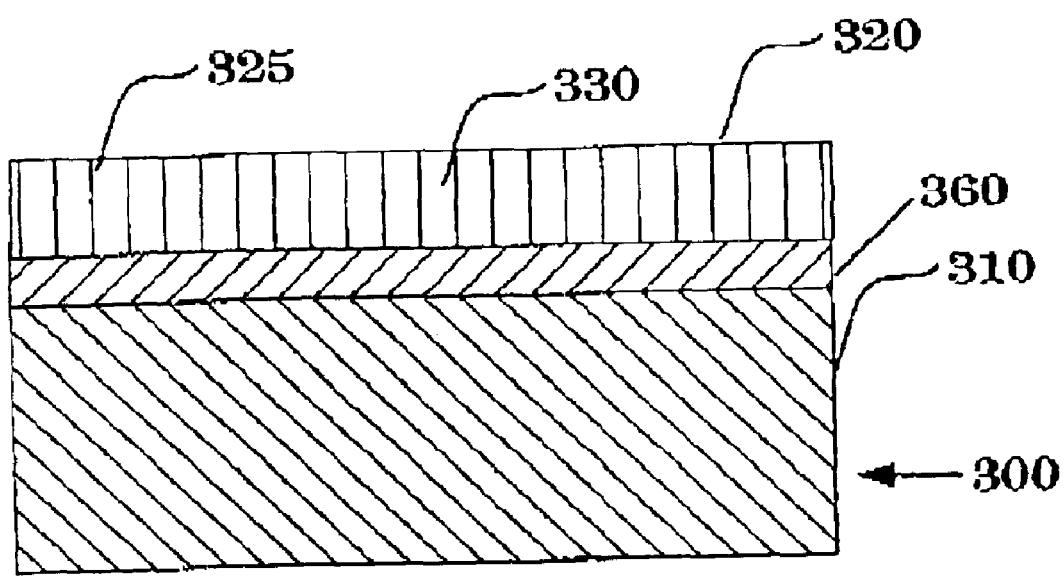
FIG. 3 is a cross-sectional view of a coated substrate in accordance with another embodiment of the invention.

FIG. 3 is a cross-sectional view of a coated substrate 300 in accordance with another embodiment of the invention. A coating 320 is disposed on a portion of a substrate 310. The coating 320 may be a single layer or a plurality of layers. The coating 320 is formed from a material adapted to form a coating. The coating 320 can include an optical brightener 325 and/or a U.V. blocker 330. A U.V. indicator 360 can be disposed between a portion of the substrate 310 and a portion of the coating 320.

Figure 4:
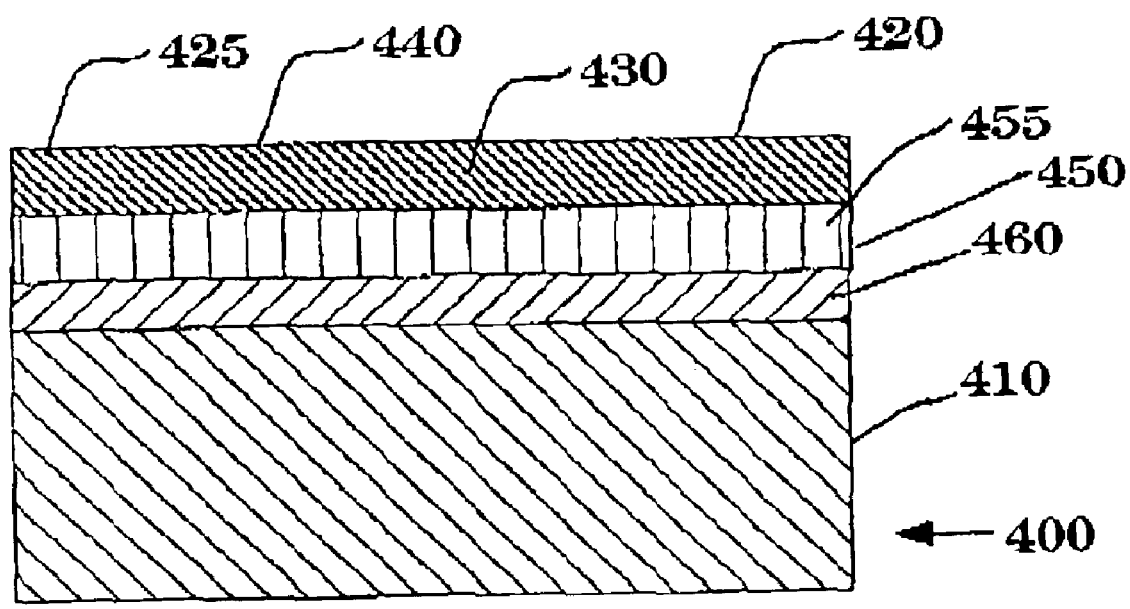
FIG. 4 is a cross-sectional view of a coated substrate in accordance with another embodiment of the invention.

FIG. 4 is a cross-sectional view of a coated substrate 400 in accordance with another embodiment of the invention. A coating 420 is disposed on a portion of a substrate 410. The coating 420 may be a single layer or a plurality of layers 440, 450. The coating 420 is formed from a material adapted to form a coating. The coating 420 can include an optical brightener 425 and/or a U.V. blocker 430. The coating can include an intermediate layer 450 disposed between a portion of the substrate 410 and a portion of a top layer 440. The top layer 440 can include or be free of an optical brightener 425 and/or a U.V. blocker 430. The intermediate layer 450 may include a pH indicator 255. A U.V. indicator 460 can be disposed between a portion of the substrate 410 and a portion of the coating 420. The U.V. indicator can be disposed between a portion of the substrate 410 and a portion of the intermediate layer 450.

Figure 5:
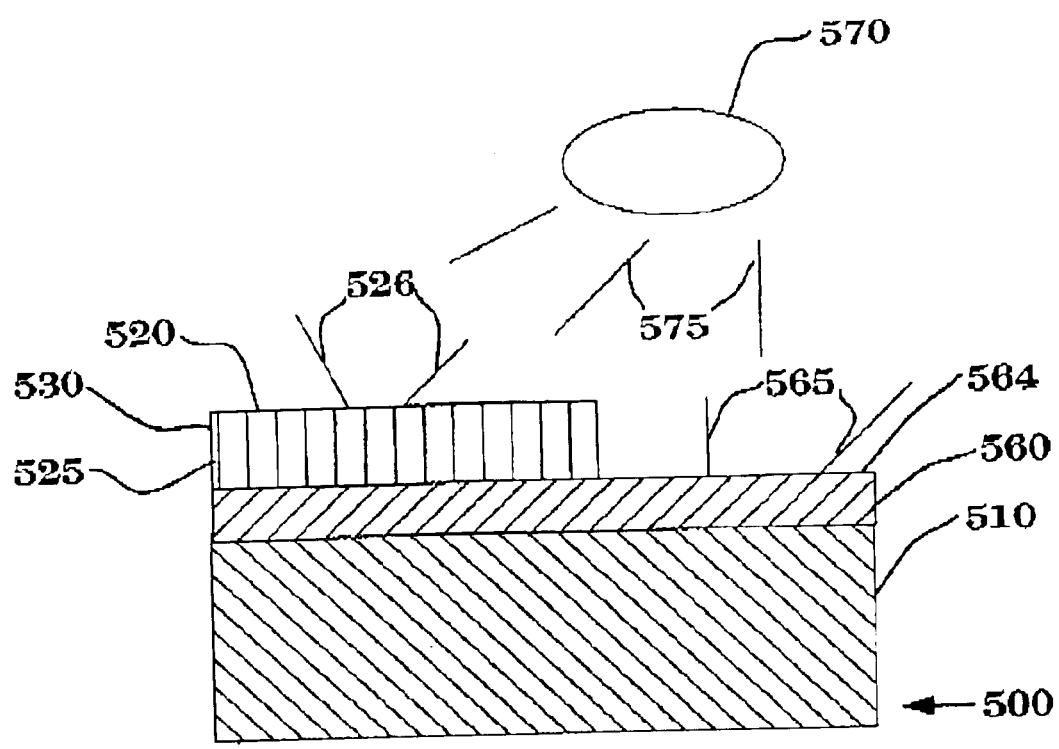
FIG. 5 is a cross-sectional view of the coated substrate shown in FIG. 3 having a U.V. light applied to the coated substrate.

FIG. 5 is a cross-sectional view of the coated substrate 300 shown in FIG. 3 having a U.V. light applied to a coated substrate 500. A U.V. light source 570 applies U.V. light or radiation 575 to the coated substrate 500. A coating 520 contains a U.V. blocker 530 that absorbs the U.V. light or radiation 575 preventing the U.V. light or radiation 575 from fluorescing 565 a U.V. indicator 560 disposed between a portion of the substrate 510 and a portion of the coating 520. A portion of the U.V. indicator 560 is exposed 564 to the U.V. light or radiation 575 causing the exposed portion 564 of the U.V. indicator 560 to fluoresce 565. An optical brightener 525 in the coating 520 fluoresces 526 when U.V. light or radiation 575 is applied to the coating 520. If both an optical brightener 525 and a U.V. indicator 560 comprise the coated substrate 500 both will fluoresce 565, 526 when exposed to U.V. light or radiation 575; the optical brightener 525 and a U.V. indicator 560 can be chosen such that each will fluoresce a different color or intensity.

Thus, if a coating 520 includes an optical brightener 525, a user can determine if the coating 520 is present simply by applying U.V. light or radiation 575 to the coated substrate 500; if the coating fluoresces 526, then the user knows that the coating 520 is still present on the substrate 510; if no fluoresce 526 is perceptible, then the user knows that the substrate 510 is no longer coated.

If the U.V. indicator 560 fluoresces 565, then the user knows that the coating 520 is no longer present or preventing U.V. light or radiation 575 from reaching the U.V. indicator. If the U.V. indicator 560 fluoresces 565, then the user can determine if another coating 520 needs to be applied. The U.V. indicator 560 can be non-destructive and remain intact for 1, 2, 3, 4, 5, 6, 7, 8, 9, 10 or more years and the coating 520 can be replaced once or a plurality of times in that time such as 2, 3, 4, 5,6 7, 8, 9, 10 or more times.

Coating Compositions/Coated Substrate

The compositions of the invention include: (a) a material adapted to form a coating; and (b) a material that fluoresces when exposed to U.V. light. The material adapted to form a coating may also include a U.V. blocker and/or a solvent.

The coated substrate of the invention includes: (a) a substrate, (b) a coating disposed on a portion of the substrate wherein the coating comprises a material adapted to form a coating and a material that fluoresces when exposed to U.V. light. The material adapted to form a coating may also include a U.V. blocker. The coating may be one or more layers disposed on the substrate. For example, an intermediate layer may be disposed between the substrate and a top layer. The intermediate layer may be free of optical brightener and further include a pH indicator.

The coated substrate of the invention may also include: (a) a substrate, (b) a U.V. indicator disposed on a portion of the substrate; and (c) a coating disposed on a portion of the U.V. indicator wherein the coating comprises a material adapted to form a coating and a U.V. blocker. The material adapted to form a coating may also include an optical brightener. The coating may be one or more layers disposed on the substrate. For example, an intermediate layer may be disposed between the substrate and a top layer. The intermediate layer may be free of optical brightener and further include a pH indicator.

Coating Material

The material adapted to form a coating may be any polymer or wax material that is able to form a coating. Polymers include for example, styrenes, urethanes, carbonates, acrylates, and the like.

The material adapted to form a coating or sealer may be based on combinations of melamine-formaldehyde resins with oil modified polyester resins, polyacrylate resins with added crosslinkers, or saturated polyesters; or on self-crosslinked polyacrylate or polyacrylate resin copolymerized with styrene.

The material adapted to form a coating or sealer may be based on an aliphatic or aromatic di-isocyanate and a hydroxyl-group-containing polyacrylate, polyester or polyether resin. Thermosetting polyacrylate resins, polyacrylate resings with added crosslinkers in combination with melamine-formaldehyde resins etherified with butanol and, further, hydroxyl-group-containing polyacrylate resins hardened with aliphatic diisocyanates may also be used.

The material adapted to form a coating or sealer may be selected from polymers, coalescents, plasticizers, waxes, alkali soluble resins and mixtures thereof.

Polymers may be selected from acrylic polymer emulsion, modified acrylic zinc complexes polymer latex, modified acrylic zinc completed polymer emulsion, acrylic styrene metal cross linked copolymers emulsion, styrene acrylic metal cross linked copolymers emulsion, acrylic styrene copolymers emulsion, styrene acrylic copolymers, mixture of any of those with urethane and fluoroacrylic polymers.

Coalescents may be various glycol ethers including, for example, monomethyl ether of diethylene glycol, monoethylether of diethylene glycol and mono-methylether of dipropylene glycol.

Permanent plasticizers may be selected from the group of dibutyl phthalate, triphenylphosphate and tributoxyethyl phosphate.

Waxes may be selected from the group of polyolefin waxes and ester of polyolefin waxes. Waxes may be selected amongst carnauba and other natural waxes.

Alkali soluble resins may be selected from the group of acrylic interpolymer of copolymer metal, ionic cross linked type or alkali soluble resins or acrylic resin or acrylic terpolymer resins.

Excipients may be selected from the group of water, coalescent mixtures of solvents and azeotropic mixtures of solvents.

The coating may include an intermediate layer disposed between the substrate and a top layer. A strippable laminate finish is disclosed at WO 01/83878 and is incorporated by reference herein. A variety of intermediate coating materials can be employed. Suitable intermediate coating materials may be strippable using a strip agent that is capable of permeating the dried overcoat. Thus, the choice of intermediate coating material can be determined in part by the chosen overcoat and stripping agent. Waterborne intermediate coating materials are preferred for ease of application. Water-soluble acrylics are a preferred class of intermediate coating materials. Water-soluble acid-containing polymers crosslinked using transition metals (e.g., metal crosslinked acrylics) are a particularly preferred class. These acid-containing polymers can be stripped using a variety of strip agents that dissolve the intermediate coating or attack the crosslinking site. Suitable commercially available intermediate coatings include GEMSTAR LASER™ and TAJ MAHAL™ acrylic finishes from Ecolab Inc.; CORNERSTONE™ and TOPLINE™ floor finishes from 3M; HIGH NOON™ acrylic finish from Butchers; CITATION™ acrylic finish from Buckeye International, Inc.; COMPLETE™, SIGNATURE™, TECHNIQUE™ and VECTRA™ acrylic finishes from SC Johnson Professional Products; SPLENDOR™, DECADE 90™, PRIME SHINE™ ULTRA and PREMIER™ acrylic finishes and FORTRESS™ urethane acrylic finish from Minuteman, International, Inc.; UPPER LIMITS™ acrylic finish from Spartan Chemical Co.; blends of ROSHIELD™ 3120 U.V. curable acrylated latex from Rohm & Haas with styrene maleic anhydride polymer as described in PCT Published Patent Application No. 98/11168; and materials such as those described in U.S. Pat. Nos. 4,517,330 and 5,319,018 and the patents cited therein. Strippable floor coatings designated as "scalers" (e.g., OVER AND UNDER™ floor scaler, available from SC Johnson Professional Products and ACRYL-KOTE™ Seal and Finish and PREP Floor Seal from Minuteman, International, Inc.) and strippable coatings based on polyvinylacetates can also be used. Blends of coatings (e.g., up to 50 weight percent of a radiation curable coating with less than 50 weight percent of a non-radiation curable coating) can also be employed as intermediate coating materials. If desired, two or more layers of different intermediate coatings can be employed in laminate finishes of the invention, in order to optimize properties such as adhesion to the substrate or to the overcoat, wear resistance, strippability, etc.

A variety of waterborne overcoat materials can be used as a top layer. Suitable overcoat materials can be less strippable than the intermediate coating, and can be permeable by a chemical strip agent that is capable of stripping the intermediate coating material. Thus, the choice of overcoat material will be determined in part by the chosen intermediate coating material and stripping agent. Polymerizable overcoat materials (e.g. two-part thermally curable or one-part photocurable materials) are preferred due to their durability. Preferably the overcoat is not metal crosslinked.

Suitable overcoat materials include urethanes, acrylics, epoxies, melamines and blends or copolymers thereof. Waterborne UV curable acrylates and urethanes are particularly preferred overcoat materials. These tend to be less strippable and more wear resistant than the metal crosslinked acrylic intermediate coatings mentioned above, and are permeable by strip agents that can be used to remove such intermediate coating materials. Suitable commercially or experimentally available waterborne overcoat materials include UV curable acrylates, urethanes and urethane acrylates (including aliphatic polyester urethane acrylates) such as ULTRA BRITE II™ UV curable coating from Minuteman, International, Inc.; the above-mentioned ROSHIELD™ 3120 UV curable acrylated latex; NEO-RAD™ NR-3709 UV curable aliphatic urethane coating from Zeneca Resins, and materials such as those described in U.S. Pat. Nos. 5,453,451 and 5,773,487. A variety of other coating resins that can be cured using suitable crosslinking agents, thermal initiators or photoinitiators can be employed, including COURTMASTER II™ waterborne acrylic urethane, available from Ecolab, Inc.; LAROMER™ PE 55W polyester acrylate, LR 8895 polyester acrylate, LR 8949 aliphatic urethane and LR 8983 aromatic urethane waterborne acrylic ester resins, all available from BASF Corp.; VIAKTIN™ VTE 6155 aliphatic urethane acrylate, VTE 6165 aromatic urethane acrylate and VTE 6169 aliphatic polyester urethane radiation curing resins, all available from Solutia Inc.; 98-283W urethane acrylate, available from Hans Rahn & Co.; and materials such as those described in U.S. Pat. No. 5,830,937. If desired, two or more layers of different overcoats can be employed in laminate finishes of the invention, in order to optimize properties such as adhesion to the intermediate coating, laminate surface appearance or properties, wear resistance, strippability, etc.

The coating may be applied or disposed on the substrate via any method such as, for example, spraying, brushing, roll coating, mopping, or flood coating. The coating or each layer of the coating can have any wet or dry thickness such as, for example, 2 to 75 micrometers, or 2 to 20 micrometers or 5 to 40 micrometers or 5 to 20 micrometers.

As will be apparent to those skilled in the art, the above-listed coating materials are merely illustrative and various other coating materials meeting the criteria set out above may also be used in the practice of the invention.

Solvent

The solvent may be aqueous or non-aqueous. The solvent may be an organic such as, for example, alcohols, glycols, and the like.

Optical Brightener

Optical brightener can also be referred to as fluorescent whitening agents or fluorescent brightening agents. Optical brighteners absorb light in the ultraviolet range 275 through 400 nm and emit light (fluoresce with the aid of a U.V. light source) in the ultraviolet blue spectrum 400–500 nm.

Fluorescent compounds belonging to the optical brightener family can be aromatic or aromatic heterocyclic materials often containing condensed ring system. These compounds may include an uninterrupted chain of conjugated double bonds associated with an aromatic ring. The number of such conjugated double bonds is dependent on substituents as well as the planarity of the fluorescent part of the molecule. Some brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in coating compositions will depend upon a number of factors, such as the type of coating, and the nature of other components present in the coating composition.

Optical brighteners are commercially available and will be appreciated by those skilled in the art. Useful FWA's include stilbene, styrene, and naphthalene derivatives. Commercially available optical brighteners include optical brighteners sold under the tradename Tinopal available from Ciba Geigy AG, Phowhite available from Bayer Chemicals, and Optiblanc available from 3V, Georgetown, S.C. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference. Commercially available optical brighteners include optical brighteners sold under the tradename Tinopal available from Ciba Geigy AG, Phowhite available from Bayer Chemicals, and Optiblanc available from 3V, Georgetown, S.C.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

U.V. Blocker

U.V. blockers or stabilizers absorb U.V. light and protect the substrate from the same. U.V. blockers or stabilizers include, for example, 2-(2'-hydroxyphenyl)-benztriazoles, 2-hydroxybenzophenones, 2,2,6,6,-tetra-alkylpiperidines, salicylates, cinnamates, benzoates or substituted benzoates and oxalic acid anilides. Further U.V. blockers or stabilizers include, for example, polybenzoylresorcinols, cyanoacrylate, benzophenone, benzotriazole derivatives, diterbutylparacresol, 4-dodecyloxy-2-hydroxybenzophenone, resorcinol monobenzoate and resorcinol.

Some materials that are optical brighteners also function as U.V. blockers such as, for example, distyryl biphenyl derivatives commercially available under the tradename Tinopol.

pH Indicator

A pH indicator defining a color precursor adapted to reveal the presence of the intermediate layer coating or sealer under determined pH conditions. The pH indicator may be uniformly distributed in the coat or seal. The pH indicator includes, for example, phenolphthalein, thymolphthalein, ortho-cresolphthalein and is adapted to become colored under appropriate pH conditions.

U.V. Indicator

The U.V. indicator fluoresces when an ultraviolet light source is trained on the U.V. indicator at a wave length in the range of about 200–400 nanometers. The U.V. indicator may be ultraviolet light sensitive dye, pigment or particle that will visibly fluoresce when subjected to the ultraviolet light emitted by the ultraviolet light source.

Many types of known ultraviolet light sensitive dyes or pigments 61 may be used. Selection of a particular dye or pigment will typically depend on the desired color to be generated when the dye fluoresces. An example of a commercially available dye is that known as "Columbia Blue"—Day-Glo Tracer Dye D-298 available from Day-Glow Color Corp. of Cleveland, Ohio. This particular dye is essentially colorless in daylight but fluoresces intense blue under ultraviolet light in the range of 360–380 nanometers. Various U.V. indicator dyes are also commercially available from UV Process Supply Inc. in Chicago Ill. Various pigment powders are commercially available from ProGlow Mfg. Company Inc.

Substrate

The substrate may be building materials such as, for example, tile, terazzo, linoleum, vinyl composition flooring, stone, concrete, wood and the like. Substrates may include, for example, walls, ceiling, labels, emblems, indoor and outdoor signs and metallic substrates.

The substrate may be metallic such as, for example, automotive surfaces. Automotive finishes can have metallic finishes, which contain flakes of metal, usually aluminum, in order to provide optical effects due to reflection. Such finishes may be a two-coat finish, in which a clear top coat is applied over a base coat containing the pigment and metal flakes. Such two-coat metallic finishes have particular need of U.V. blockers in the top coat, since the polymer in this coat is not protected by light absorbing pigments, and it is subjected to almost double the normal amount of radiation because of reflection of light from the lower metallic layer.

The coating compositions of can be sold in the form of a kit containing a U.V. indicator and a material adapted to form a coating including a U.V. blocker. The material adapted to form coating can further include an optical brightener. The U.V. indicator and material adapted to form a coating including a U.V. blocker can be packaged in containers (e.g., separate containers) together with suitable directions for carrying out the methods of the invention. If desired, the material adapted to form a coating including a U.V. blocker or U.V. indicator could be packaged as a concentrate intended to be mixed with water or another suitable diluting solvent at about a 15–40% solids level. The kit can also contain additional coating materials that can be applied to the substrate before application of the U.V indicator or material adapted to form a coating, such as, for example, overcoat materials (e.g., wax finishes).

EXAMPLES

A water soluble U.V. sensitive dye CO98-012 Inv Ink w/B N/P Yellow (available from UV Process Supply Inc. Chicago Ill.) was applied to a ceramic tile spelling the phrase "WAX ME". The U.V. sensitive dye was allowed to dry and two coats of a sealing layer of Gemstar Laser was sprayed on the U.V. sensitive dye. A coating of Padlock coating containing an optical brightener Tinapol that also absorbs light in the U.V. range was applied to the tile covering the "W" and "M", and allowed to dry. When U.V. light source was applied to the tile the "AX" and "E" glowed in a bright green color and the remaining portions of the tile covered by the Padlock coating with optical brightener glowed in a bright blue color. The letters under the Padlock coated half did not glow green.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

We claim:

1. A coated metallic substrate comprising:
   a. a metallic substrate comprising an automotive surface;
   b. a U.V. indicator disposed on a portion of the metallic substrate; and
   c. a coating comprising a U.V. blocker disposed on a portion of the U.V. indicator.

2. The coated metallic substrate of claim 1, wherein the automotive surface includes a two-coat finish comprising a clear top coat applied over a base coat containing pigment and metal flakes.

3. The coated metallic substrate of claim 2, wherein the metal flakes comprise aluminum flakes.

4. A method of protecting a metallic finish on an automotive surface, comprising steps of:
   a. applying a U.V. indicator on a portion of the metallic finish disposed on the automotive surface;
   b. applying a coating composition comprising a material adapted to form a coating and a U.V. blocker on a portion of the U.V. indicator; and
   c. drying the coating composition.

* * * * *